March 30, 1965 N. E. B. LARSSON 3,175,754
SYSTEM FOR CONTROLLING CAPACITY REGULATION OF
MULTI-CYLINDER RECIPROCATING COMPRESSORS
Filed June 26, 1961 3 Sheets-Sheet 1

Inventor
Nils E. B. Larsson
by Sommers & Young
Attorneys

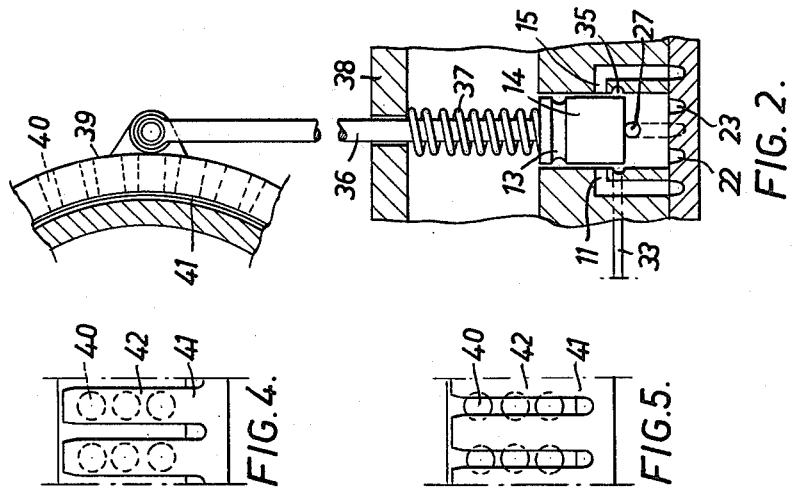
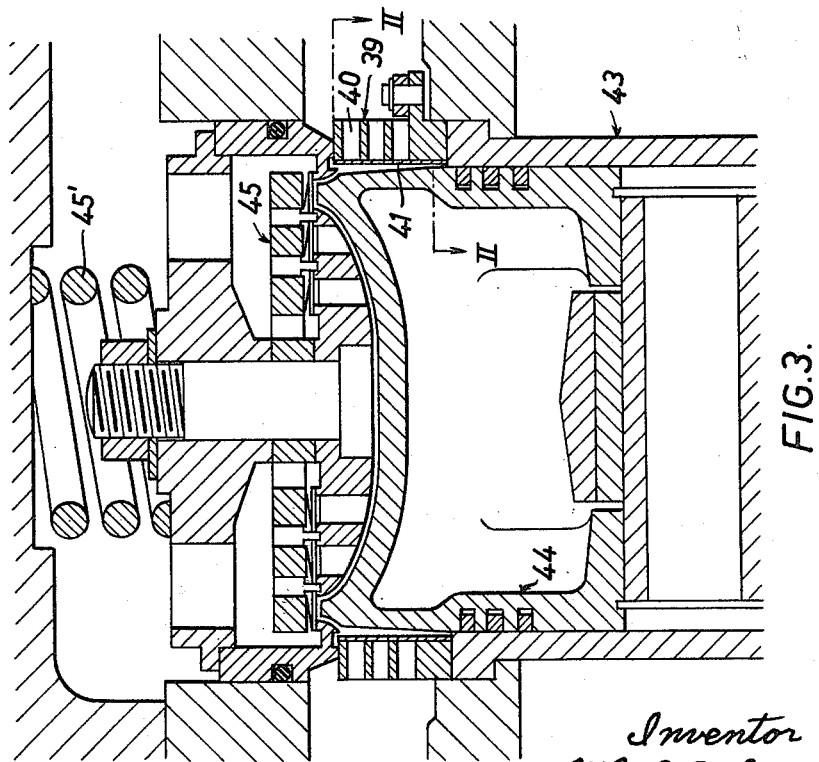

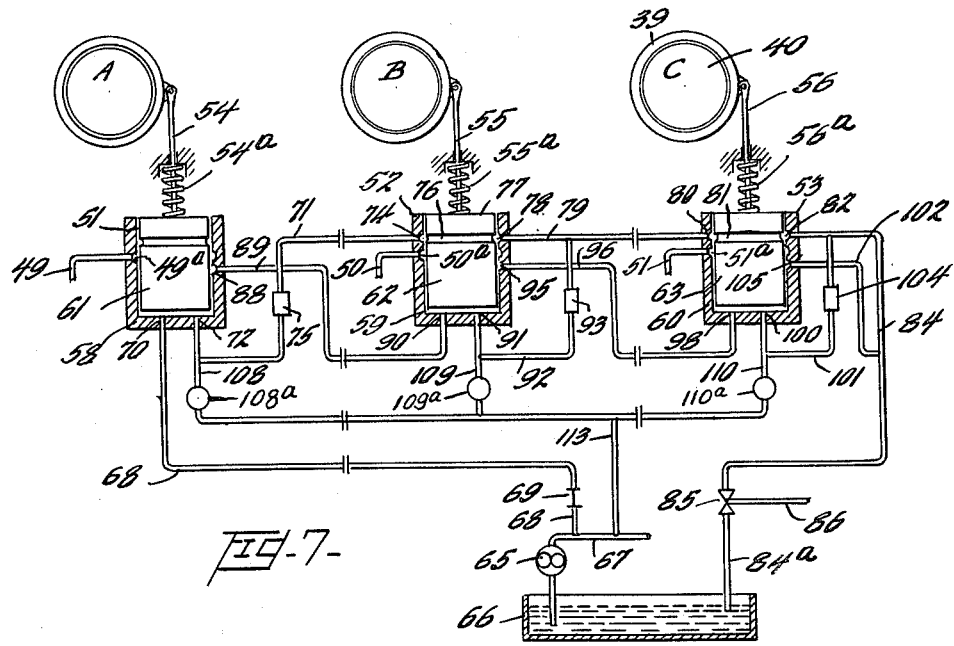
FIG-7-
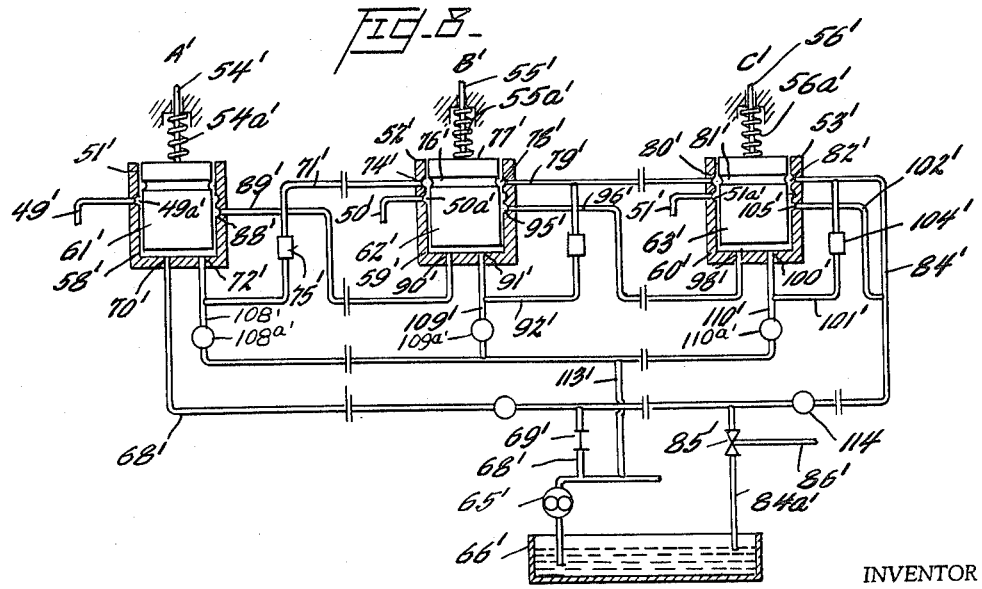
FIG-8-
INVENTOR
Nils E. B. Larsson,
BY Sommers + Young
ATTORNEYS United States Patent Office 3,175,754
Patented Mar. 30, 1965

3,175,754
SYSTEM FOR CONTROLLING CAPACITY REGULATION OF MULTI-CYLINDER RECIPROCATING COMPRESSORS
Nils E. B. Larsson, Sodermalmsvagen 11,
Finspang, Sweden
Filed June 26, 1961, Ser. No. 119,421
Claims priority, application Sweden, July 1, 1960,
6,428/60
8 Claims. (Cl. 230—31)

This invention relates to multi-cylinder reciprocating compressors and especially to a device for controlling the capacity regulation of such compressors.

The capacity or load control of such compressors is carried out in different ways, such as for example by holding the inlet valve open. Actuating operators for effecting said load control may consist of hydraulically or pneumatically operated servomotors governed by a master control, for instance by means of pressure impulses transmitted by a control valve to said actuating operators by the intermediacy of a distribution valve. Pressure impulses are also used to directly actuate a distribution valve.

The primary object of the invention is to provide a simple master control system in which no distribution valves are needed and in which the actuating operators themselves in the form of servomotors carry out functions normally delegated to said distribution valve.

Another object of the invention is to provide a master control system in which the servomotors pre-regulate each other in such a manner that only one servomotor at a time can be set or re-set in proper sequence.

Still another object of the invention is to provide a hydraulic master control system in which pressure fluid used for control purposes is recirculated to its greater part.

Another object of the invention is to provide a hydraulic master control system in which the resetting of the actuating operators for load control are automatically rapidly reset to unloaded position at a stop of the multi-cylinder compressor.

For this and other purposes my invention is particularly characterized in that each servomotor serving as an actuating operator for the load control means of an associated compressor cylinder is provided on one hand with an inlet and an outlet opening for pressure fluid in its cylinder chamber, said outlet port being connected to the discharge conduit of the system through a series of by-pass ducts one for each subsequent servomotor and controlled by the pistons thereof such as the by-pass duct of each servomotor is blocked by the movement of its piston, and on the other hand in its peripheral wall with a second outlet port adapted to be exposed to the cylinder chamber by the servomotor piston at the end of its stroke, said second outlet port being in communication with the inlet opening of the cylinder chamber of the subsequent servomotor, the outlet of the last servomotor being connected with the discharge conduit from the system. Means are further provided for supplying a certain flow of pressure fluid through the inlet opening of the first servomotor and means governed in response to the desired compressor capacity for restricting or blocking the flow through the system are provided in the discharge conduit from the system.

Some preferred embodiments of the invention are hereinafter described with reference to the drawings which accompany and form a part of this specification.

In the drawings:

FIG. 2 is a partial sectional view of a servomotor forming a part of the invention and adapted to serve as an inlet valve unloading operator.

FIG. 3 is a partial sectional elevation of the top of a compressor.

FIGS. 4 and 5 are fragmentary views showing inlet valve regulating means for the compressor in two different positions.

FIG. 7 is a schematic diagram illustrating a control system of the type represented in FIG. 1, applied to a compressor having three cylinders.

FIG. 8 is a schematic diagram illustrating a control system of the type represented in FIG. 6, applied to a compressor having three cylinders.

Figure 1:
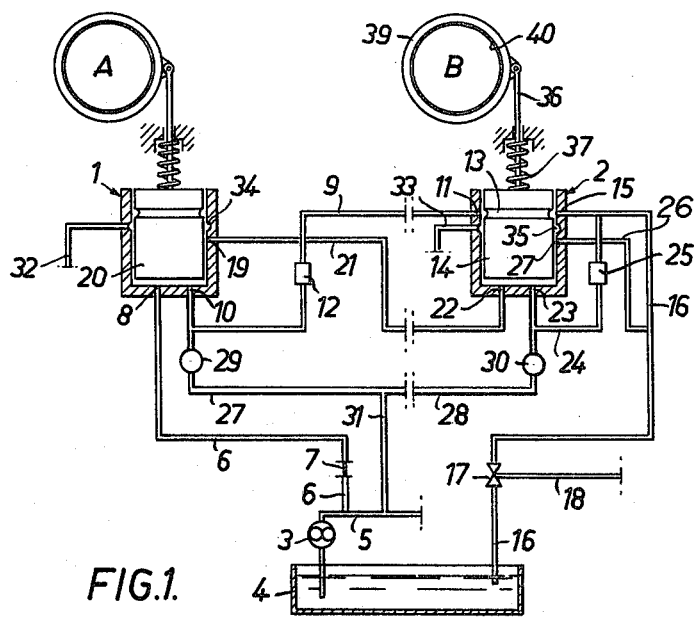
FIG. 1 is a schematic diagram of a control system according to the invention.

FIG. 1 is a diagram of a control system according to the invention in which two servomotors 1 and 2 adapted to operate the capacity regulation means of a refrigeration compressor are shown. It should however be noticed, that the control system may include any number of servomotors. Although in the system shown one servomotor is considered to be arranged for each cylinder represented by A and B respectively of a refrigeration compressor a servomotor may serve a group of such cylinders.

The pressure fluid for the control system is, by way of example, derived from an oil pump 3 adapted to take oil from an oil sump 4 and pass it to the lubrication system, not shown, of the refrigeration compressor through a conduit 5. A branch conduit 6 connects the servomotor 1 with said conduit 5 and includes constriction means such as a capillary tube 7. Said conduit 6 discharges through an inlet opening 8 into the cylinder chamber of the servomotor 1.

A conduit 9 forming a portion of a by-pass conduit system connects an outlet opening 10 in said cylinder chamber of the servomotor 1 with an inlet port 11 in the peripherial wall of the second servomotor 2. Said conduit 9 includes constriction and/or check valve means 12. The check valve of said means is adapted to prevent a flow from the second to the first servomotor. The inlet port 11 in the peripheral wall of the servomotor 2 is located in register with an annular groove 13 in the piston 14 when said piston is in its position for unloading the compressor cylinder. Spaced from said inlet port 11 and at the same level a discharge port 15 is provided in the cylinder wall thereby forming a by-pass duct connected with a discharge conduit 16 leading back to the oil sump 4. A control valve 17 is provided in said discharge conduit 16 for closing or opening the same. Impulses for governing the control valve 17 are supplied through a conduit 18.

From the foregoing it is easily understod that the conduit forms 6, 9, 13, 16 described a continuous path through both servomotors 1 and 2 so that pressure fluid fed through the capillary tube 7 may freely pass therethrough except for the restriction at said constriction means 7 and 12.

In the cylinder wall of the first servomotor a second outlet port 19 is provided in such a position as to communicate with the cylinder chamber only at the outer end of the stroke of the servomotor piston 20, that is, when the piston is in position for loading the compressor cylinder. An overflow conduit 21 connects said second outlet port 19 with an inlet opening 22 in the cylinder chamber of the second servomotor 2. Said inlet opening 22 corresponds to the inlet opening 8 of the first servomotor 1. An outlet opening 23 (corresponding to 10 of servomotor 1) is provided in the cylinder chamber of the second servomotor 2 and is through an outlet conduit 24 connected with the discharge conduit 16. Construction and/ or check valve means 25 similar to means 12 in the by-pass conduit 9 from the first servomotor 1 are provided in said outlet conduit 24.

In the position of the piston 20 of the servomotor 1 for loading the compressor cylinder the conduit system 21, 24 forms a continuous passage from the cylinder chamber of the first servomotor 1 to said second servomotor. The check valve means 25 are adapted to close the flow in a direction opposite to that described.

A conduit 26 corresponding to the overflow conduit 21 connects a second outlet port 27 (corresponding to 19 of servomotor 1) in the peripheral wall of the second servomotor 2 with the discharge conduit 16.

It should be understood that any number of servomotors may be interconnected in the manner described by means of by-pass and overflow conduits similar to 9 and 21.

Further a conduit system show in FIG. 1 may be arranged in order to permit a simultaneous return motion of all servomotor pistons rapidly if the compressor stops, so that the compressor can start immediately unloaded. For this purpose a drainage conduit 27 and 28 respectively is connected to the cylinder chamber of each servomotor. A check valve 29 and 30 respectively preventing flow towards the cylinder chamber is provided in each of said drainage conduits 27, 28. The drainage conduits 27, 28 are through a conduit 31 connected with the conduit 5 leading from the pump 3 to the lubrication system of the refrigeration compressor. Due to the pressure difference created by the construction means 7 the check valve 29, 30 will normally be urged closed during normal operation, when the pressure in the drainage system 27, 28, 31 is higher than that in the cylinder chambers.

Further a drainage conduit 32, 33 from an annular groove 34, 35 in the peripheral wall of the servomotor cylinder carries away any oil leakage thus preventing it from distributing regulation.

In FIGS. 2–5 said servomotor and capacity regulation means for a compressor cylinder are shown in more details. FIG. 2 being a sectional view partially taken along line II—II in FIG. 3 shows the second servomotor 2 with the inlet and outlet openings 22, 23 for the pressure fluid, the second outlet port 27 in the peripheral wall of the cylinder, the drainage conduit 33 in communication with an annular groove 35 in the cylinder wall and the inlet and outlet openings 11 and 15 respectively in the cylinder wall for communication with the annular groove 13 in the piston 14 forming the by-pass duct controlled by the piston 14. A piston rod 36 connects the piston 14 with load regulating means of the associated compressor cylinder B. A compression spring 37 is inserted between a fixed shoulder 38 and the piston 14 to urge the latter to compressor cylinder unloading position.

Said load control means may consist of a rotatable ring 39 adapted to be operated by said piston rod 36 and having inlet openings 40 therein cooperating with an inlet valve member 41 having separate flexible tongues 42 adapted to open and close said openings 40.

The inlet valve actuating means are described in my Patent No. 3,112,063, dated November 26, 1963, and Patent No. 3,136,479 dated June 9, 1964.

Although the present control system may be used in connection with other types of capacity regulation means of the compressor the embodiment shown will be shortly described with reference to FIGS. 3–5.

In FIG. 3, 43 represents a cylinder of a reciprocating compressor having a piston 44 and an outlet valve 45 at a top of the cylinder. A compression spring 45' keeps the outlet valve 45 in place. Around the upper portion of the cylinder 43 said rotatable perforated ring 39 is provided in cooperation with the stationary inlet valve means 41. The tongues 42 and the inlet openings 40 are co-ordinated such that in one position of said ring 39 (FIG. 4) said tongues 42 cover the inlet openings 40 thereby acting as inlet valves. For unloading the compressor the perforated ring 39 is turned to the position shown in FIG. 5, where the inlet openings of the ring 39 are in register with the space between adjacent tongues 42 of the inlet valve member 41, thereby permitting the air to freely pass on both directions through said openings at the reciprocation of the piston 44 of the compressor.

The function of the described control system is as follows:

In unloading condition of the compressor the pistons 20, 14 of the servomotors take up the position shown in FIG. 1. From conduit 5 a small quantity of pressure fluid is bled off through the capillary tube 7 and the inlet conduit 6 to the cylinder chamber of the first servomotor 1. From said cylinder chamber the pressure fluid passes through the by-pass conduit 9 and its constriction means 12, the annular groove 13 in the piston 14 of the second servomotor 2, the discharge conduit 16 and the control valve 17 to the oil sump 4. As long as the control valve 17 is open no appreciable pressure will be built up in said conduit system.

The control valve 17 is governed by the pressure variations in the conduit 18 such that the control valve 17 closes to restrict the flow of fluid pressure through the discharge line 16 when capacity should be increased and opens when the capacity of compressor should be reduced. The fluid pressure in the conduit system 6, 9, 16 depends on the balance between pressure fluid entering through the capillary tube 7 and pressure fluid drawn off through the control valve 17.

When the control valve 17 closes the pressure rises in the conduit system and the cylinder chamber of the first servomotor 1. Due to the by-pass conduit formed by the annular groove 13 in the subsequent servomotors, the latter will be left unactuated. Due to the pressure built up in the cylinder chamber of the first servomotor 1 piston 20 is against the bias force of the spring 42 moved to its opposite position thereby adjusting the capacity regulation means 39 of the associated compressor cylinder A to load condition. When the piston 20 reaches said opposite position fluid pressure will pass through the overflow conduit 21 to the cylinder chamber of the second servomotor 2. The constriction or check valve means 12 in the by-pass conduit 9 will prevent back flow through said conduit. If then the control valve 17 still restricts the flow further pressure will be built up in the cylinder chamber of the second servomotor 2 thereby urging the piston 14 of the same to its opposite position for loading the associated compressor cylinder B. At the same time the piston 14 will block the by-pass duct between the ports 11 and 15, so that the piston 20 of the first servomotor cannot return until the piston 14 of the second servomotor has been returned to its initial or compressor unloading position thereby connecting the conduit 9 with the discharge conduit 16. Thus only one servomotor piston 14 or 20 can be set or reset at a time.

If the control valve 17 opens the pressure in the discharge line 16 and consequently in the cylinder chamber of the second servomotor 2 decreases so that the piston 14 of said servomotor is returned by its spring 37 thereby connecting the cylinder chamber of the first servomotor 1 with the discharge line 16 through the annular groove 13 in the piston 14 of the second servomotor.

If the compressor stops no pressure fluid will be discharged from the pump 3 thereby interrupting the feed of pressure fluid through the capillary tube 7. Simultaneously the control valve 17 is closed. At that time the pressure in the conduit 5 and thereby in the drainage conduits 27, 28, 31 decreases so that the springs of the servomotors can rapidly return the respective pistons 20, 13 to their initial position for adjusting the capacity regulating means of the compressor cylinders to their unloading positions. Thereby the compressor can be started unloaded immediately after a stop.

Figure 6:
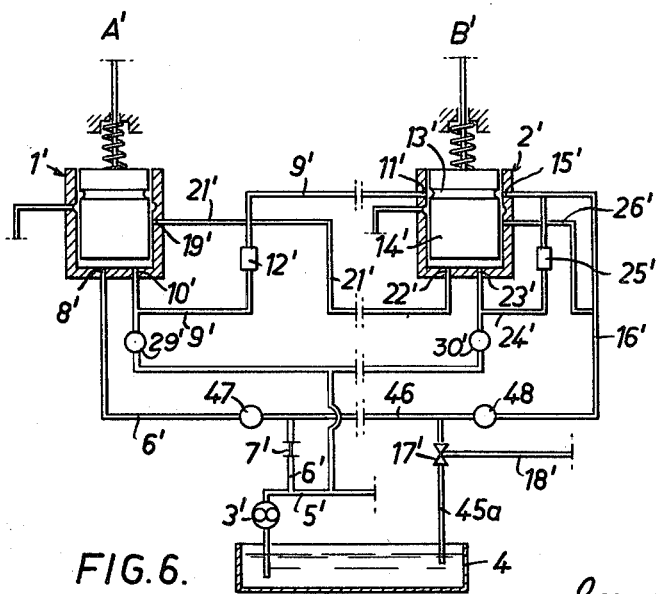
FIG. 6 is a schematic diagram similar to that shown in FIG. 1 of a modified control system according to the invention.

FIG. 6 shows a schematic diagram of a modified control system according to the invention. In said FIG. 6 parts similar to those in FIG. 1 are designated with the same numbers with a prime sign added thereto. In this control system as is described in connection with FIG. 1 pressure fluid drawn from an oil sump 4' by a pump 3' and passed through a conduit 5' to the lubrication system (not shown) of the refrigeration compressor. A conduit 6' with a capillary tube 7' connects said conduit 5' with the cylinder chamber of the first servomotor 1'. A conduit 9' connects the cylinder chamber of said first servomotor 1' through a by-pass duct 13' in the piston 14' of the second servomotor 2' with the discharge conduit 16'. From the peripheral wall of the cylinder of the first servomotor 1' an overflow conduit 21' leads to the cylinder chamber of the second servomotor 2'. A conduit 24' connects the cylinder chamber of said second servomotor 2' with the discharge line 16' by the intermediacy of constriction and/or check valve means 25'. Conduit 26' connects a port 27' in the peripheral wall of the cylinder of the second servomotor 2' with said discharge conduit 16'. A conduit 45a connects said discharge conduit 16' with the oil sump 4' and includes the control valve 17' governed by pressure impulses through the conduit 18' as is described in the foregoing.

In this modification the discharge conduit 16' and said pressure fluid supply conduit 6' are connected by a recirculation conduit 46. A check valve 47 is provided in the pressure fluid supply conduit 6' to prevent back flow from its associated cylinder chamber. Likewise a check valve 48 is provided in the discharge line 16' to prevent back flow to the servomotor through the same.

This version functions as follows: When the compressor operates pressure fluid flows through the capillary tube 7' and the recirculation conduit 46 to the control valve 17'. Pressure variations in the recirculation conduit 46 are determined by pressure fluid drawn off at the control valve 17'. If the pressure is caused to rise due to the control of said valve 17' pressure fluid is caused to flow through the check valve 47 in conduit 6' to the cylinder chamber of the first servomotor 1'. On the other hand if the pressure drops due to the control of the valve 17' said check valve 47 prevents return of pressure fluid from the cylinder chamber through said conduit 6'.

If the fluid pressure in the discharge conduit 16' exceeds that in the recirculation conduit 46 the pressure fluid can flow from said discharge conduit 16' through the check valve 48 into the recirculation conduit 46 and further through the check valve 47 and the conduit 6' to the cylinder chamber of the first servomotor 1'.

The fluid pressure variation in the recirculation conduit 46 which is determined by the control valve 17', sets up a pressure differential between the conduits 6' and 16'. If the pressure rises in the conduit 6', the piston 20' of the first servomotor 1' moves outwardly so as to load the associated compressor cylinder. The pressure fluid can only slowly pass through the constriction means 12'. When the piston 20' reaches the opposite end of its stroke, the outlet port 19' to the overflow conduit 21' to the cylinder of the second servomotor 2' opens and only then the piston 14' of said second servomotor 2' can start its stroke, blocking the by-pass duct 13' and thereby the fluid flow through the constriction means 12' in conduit 9' from the first servomotor 1'. Thus piston 20' of the first servomotor 1' can not return before the piston 14' of the second servomotor 2' has returned to its initial position. Thus the same control sequence for increasing and decreasing the capacity of the compressor as described in connection with FIG. 1 is obtained.

The advantage of the modification as shown in FIG. 6 resides in the fact that an extremely small quantity of fresh pressure fluid is passed from the conduit 5' through the capillary tube 7' due to the fact that said conduit 46 connecting the discharge conduit 16' with the supply conduit 6' forms a recirculation system. As a result thereof deposits of impurities from the pressure fluid in the system are considerably reduced.

Moreover setting speed can be more easily varied by altering the constriction means 12' such as capillary tubes. It is also possible to dispense with a capillary tube and use only check valves. Moreover, the device will also function in the absence of both check valve and capillary tubes. In the latter case the motion of the piston of the second servomotor 2' will be of such extent that the inlet port 11' of the by-pass conduit system 9', 11', 13', 15', 16' is blocked, preventing motion until the piston of the first servomotor 1' completes its stroke.

It should further be noticed that said capillary tube 12' can be a manually adjustable shut-off valve which can be closed to permit manual settings of the desired number of compressor cylinders at full load by means of their associated servomotor.

In FIG. 7 the invention is diagrammatically represented as applied to a compression having three cylinders designated A, B and C respectively. These cylinders may be similar to that shown and described in connection with FIGS. 2-5, inclusive.

Each of cylinders is controlled by one of the three servomotors designated 51, 52, and 53, respectively through rods 54, 55 and 56, respectively, against the pressure of springs 54a, 55a, and 56a. Each of the servomotors is comprised of a cylinder 58, 59, 60, respectively; in each of which a piston 61, 62, 63, respectively is reciprocatorily accommodated.

The pressure fluid for the control system is, by way of example, derived from an oil pump 65 adapted to take oil from an oil sump 66 and pass it to the lubrication system, not shown, of the refrigeration compressor through a conduit 67. A branch conduit 68 connects the servomotor 51 with said conduit 67 and includes constriction means such as a capillary tube 69. Said conduit 68 discharges through an inlet opening 70 into the cylinder chamber of the servomotor 51.

A conduit 71 forming a portion of a by-pass conduit system connects an outlet opening 72 in said cylinder chamber of the servomotor 51 with an inlet port 74 in the peripheral wall of the second servomotor 52. Said conduit 71 includes constriction and/or check valve means 75. The check valve of said means is adapted to prevent a flow from the second to the first servomotor. The inlet port 74 in the peripheral wall of the servomotor 52 is located in register with an annular groove 76 in the piston 77 when said piston is in its position for unloading its compressor cylinder. Spaced from said inlet port 74 and at the same level a discharge portion 78 is provided in the cylinder wall thereby forming a by-pass duct connected with a conduit 79 leading to an inlet opening 80 in the side wall of the third servomotor 53 located adjacent an annular groove 81 formed in the piston of said third servomotor when said piston is in position for unloading its corresponding compressor C. Spaced from said inlet opening 80 and at the same level a discharge port 82 is provided in said cylinder wall, thereby forming a by-pass duct connected to a discharge conduit 84 leading back to the oil sump 66. A control valve 85 is provided in said discharge conduit 84 for closing or opening the same. Impulses for governing the control valve 85 are supplied through a conduit 86.

From the foregoing it is easily understood that the conduits 68, 71, 76, 79, 81, 84 described forms a continuous path through all three servomotors 51, 52, and 53 so that pressure fluid fed through the capillary tube 69 may freely pass therethrough except for the restriction at said constriction means 69 and 75.

In the cylinder wall of the first servomotor 51 a second outlet port 88 is provided in such a position as to communicate with the cylinder chamber only at the outer end of the stroke of the servomotor piston 61, that is, when the piston is in position for loading the compressor cylinder. An overflow conduit 89 connects said second outlet port 88 with an inlet opening 90 in the cylinder chamber of the second servomotor 52. Said inlet opening 90 corresponds to the inlet opening 70 of the first servomotor 51. An outlet opening 91 corresponding to 72 of servomotor 51, is provided in the cylinder chamber of the second servomotor 52 and is, through a conduit 92, connected with the conduit 79 leading to opening 80 in the side wall of servomotor 53. A constriction or check valve 93 is also provided in conduit 92.

The cylinder 59 of servomotor 52 is also provided with an outlet opening 95 connected with conduit 96 leading to inlet 98 in the end of cylinder 60 of servomotor 53 for transmitting actuating fluid to move piston 63 to operate the valves of compressor C. This cylinder 60 also has a discharge opening 100 connected with conduit 101 which in turn is connected with return pipe 84. Conduit 101 is provided with a constriction of check valve 104.

An overflow conduit 102 is connected to an opening 105 in the side wall of cylinder 60 and leads to discharge conduit 84.

An oil drainage system comprises conduits 49, 50 and 51 connected respectively, with annular grooves 49', 50' and 51' in the respective servomotor cylinders carries away oil leakage, thus, preventing it from interferring with operation.

For the purpose of draining all of the servomotors quickly in case the compressor should stop a system of conduits comprising conduit 108, 109 and 110, having check valves 108a, 109a, and 110a, respectively, is provided connected, respectively, with conduits 71, 92, and 101. These conduits are mutually connected with a conduit 113 connected with conduit 67 leading from 65.

The functioning of the embodiment represented by FIG. 7 is substantially similar to that described in connection with the embodiment represented by FIG. 1, except that three servomotors are involved, and the conduits are, therefore, necessarily more numerous and the by-pass conduit system includes piston groove 76 of the middle servomotor 52, and conduit 79 connecting said groove with servomotor 53.

The embodiment of the invention diagrammatically represented by FIG. 8 also involves control of a compressor having three cylinders and therefore also involves three servomotors. The apparatus and system of connection is substantially similar to that of FIG. 7 and therefore a repetition of the description thereof is deemed unnecessary, except with respect to the conduits associated with the supply of actuating fluid to the servomotors and return of the fluid through the discharge conduit 84'. In this embodiment discharge conduit 84' is connected through check valve 114' with conduit 68' as well as to the oil sump 66'.

In other respects the apparatus and system of FIGS. 7 and 8 are the same and therefore, substantially similar reference numerals are used except that they are primed in FIG. 8 or double primed.

While the forms of the system herein shown and described is admirably adapted to fulfill the objects primarily stated it is to be understood that it is not intended to confine the invention to said forms, since numerous modifications and changes will readily occur to those skilled in the art after a consideration of the foregoing specification and accompanying drawings, but all suitable modifications and equivalents may be restored to, falling within the scope of the appended claims.

I claim:

1. In a system for capacity control of a multi-cylinder reciprocating compressor in combination a power driven fluid pump providing a source of pressure fluid, a plurality of servomotors, each servomotor comprising a cylinder forming a chamber and being provided with an inlet, conduit means connecting said source of pressure fluid with said inlets of said chambers, said chambers each having an outlet opening for pressure fluid in permanent communication with the fluid in said chambers of each servomotor, a discharge conduit, a bypass duct connecting said outlet opening of one of said servomotors to said discharge conduit by way of another of said servomotors, said other servomotor having a piston provided with an annular groove controlling said bypass duct to be blocked by the movement of said piston from an initial position, and said other servomotor having in its cylinder a second outlet port exposed to its cylinder chamber by the servomotor piston at the outer end of its stroke from said initial position, means providing communication between said second outlet port and said inlet opening of the cylinder chamber of said second servomotor.

2. A servomotor device as claimed in claim 1, in which a drain conduit including a check valve is provided for each servomotor cylinder for simultaneous release of all servomotor cylinders, when the fluid pressure in the servomotor system is reduced, so as to make possible a rapid readjustment of the servomotors.

3. In a servomotor device as claimed in claim 1, the provision of a check valve means in connection with said outlet openings from the servomotor cylinders for preventing return flow through said by-pass duct.

4. In a servomotor device as claimed in claim 1 the provision of flow-restricting means of capillary tube type in connection with said outlet opening from the servomotor cylinder for restricting and controlling the setting speed of the servomotor.

5. A servomotor device as claimed in claim 1 in which the flow-restricting means comprises a manually adjustable shut-off valve which can be closed for manual setting of a desired number of servomotors.

6. In a servomotor device as claimed in claim 1 the provision of a pressure fluid recirculating conduit between the pressure fluid supply means to the first servomotor and the discharge means from the last servomotor, said recirculating system including a check valve in said supply means permitting only flow towards said first servomotor and a check valve in said discharge means permitting flow in the direction from the last servomotor.

7. A servomotor device for capacity control of a multicylinder reciprocating compressor comprising a series of servomotor cylinders, a pump providing a source of pressure fluid each of said cylinders having a chamber therein, and each of said chambers having a piston located therein, each of said servomotor cylinders being provided with inlet and outlet opening ducts providing permanent communication between said cylinder chambers and said pressure fluid, said cylinders each having a second outlet port exposed by the respective servomotor piston at the end of its stroke, said servomotors, except for a first one thereof, have a piston controlled bypass duct comprised of a groove in its piston and inlet and outlet openings in its cylinder wall so arranged relative to said groove in said piston that the duct is opened when the piston is at the bottom of its stroke but blocked in other piston positions; said servomotors being interconnected by means of conduits which join said second outlet port of one of said servomotors with the inlet opening of another of said servomotors; the outlet conduit from one of said outlet openings being connected to the inlet opening of the bypass duct in the next servomotor cylinder; the outlet opening from one bypass duct being connected to the inlet opening of the bypass duct of the next servomotor of said series; and the second outlet port and the outlet opening from the bypass duct for the last servomotor being connected to a discharge conduit having a pressure fluid flow control valve.

8. In a device as claimed in claim 7 the further feature that said conduits between the servomotors consist of grooves cast in a cover, which also functions as servomotor cylinder cover.

(References on following page)

References Cited in the file of this patent

UNITED STATES PATENTS

| | | |
|---|---|---|
| 1,743,367 | Maybach | Jan. 14, 1930 |
| 1,774,836 | Lormuller | Sept. 2, 1930 |
| 1,905,065 | Scholl | Apr. 25, 1933 |
| 2,112,466 | Maloon | Mar. 29, 1938 |
| 2,136,318 | Rossmann | Nov. 8, 1938 |
| 2,141,069 | Newell | Dec. 20, 1938 |
| 2,208,428 | Nicolet | July 16, 1940 |
| 2,371,893 | Hyland | Mar. 20, 1945 |
| 2,398,178 | Ellison | Apr. 9, 1946 |
| 2,690,292 | Schmidlin | Sept. 28, 1954 |
| 2,925,718 | Switzer | Feb. 23, 1960 |
| 2,966,031 | Vltavsky | Dec. 27, 1960 |
| 2,973,133 | Newton | Feb. 28, 1961 |
| 2,982,308 | Oberdorfer et al. | May 2, 1961 |
| 3,067,583 | Erdelyi | Dec. 11, 1962 |